United States Patent
Gugala et al.

[11] Patent Number: 5,590,680
[45] Date of Patent: Jan. 7, 1997

[54] EXTERNAL VALVE OPERATING MEANS

[75] Inventors: Zbigniew H. Gugala, Spring Grove; John N. Scapes, Schaumburg, both of Ill.

[73] Assignee: Henry Valve Company, Melrose Park, Ill.

[21] Appl. No.: 604,750

[22] Filed: Feb. 23, 1996

[51] Int. Cl.[6] .............. F16K 41/04; F16K 43/00; F16J 15/20; F16J 15/48
[52] U.S. Cl. .............. 137/312; 73/46; 137/315; 251/214; 251/315.01; 251/315.14; 251/900; 277/9
[58] Field of Search .............. 73/46; 137/312, 137/315; 251/214, 315.01, 900; 277/9, 24, 29, 70, 71, 72 R, 110, 123, 125

[56] References Cited

U.S. PATENT DOCUMENTS

| | | | |
|---|---|---|---|
| 1,707,840 | 4/1929 | Benton | 137/223 |
| 1,961,035 | 5/1934 | Dowden | 137/223 |
| 1,969,224 | 8/1934 | Lear | 137/223 |
| 1,969,225 | 8/1934 | Lear | 137/223 |
| 1,989,994 | 2/1935 | Lear | 137/233 |
| 2,178,828 | 11/1939 | Broecker | 137/233 |
| 2,311,748 | 2/1943 | Gora | 137/223 |
| 3,456,679 | 7/1969 | Graham | 251/214 |
| 4,072,161 | 2/1978 | Schoeneweis et al. | 251/900 |
| 4,337,788 | 7/1982 | Seger | 137/315 |
| 4,384,705 | 5/1983 | Kato | 251/214 |
| 4,469,122 | 9/1984 | Meek | 137/315 |
| 4,926,898 | 5/1990 | Sampey | 137/315 |
| 5,129,624 | 7/1992 | Icenhower et al. | 251/214 |
| 5,178,363 | 1/1993 | Icenhower et al. | 251/214 |
| 5,241,980 | 9/1993 | Corte | 137/312 |
| 5,476,117 | 12/1995 | Pakula | 137/312 |

*Primary Examiner*—George L. Walton
*Attorney, Agent, or Firm*—Lockwood, Alex, Fitzgibbon & Cummings

[57] ABSTRACT

An external valve operating means that forms a seal around the rotating valve stem of a valve operating under internal pressure is disclosed. This seal prevents the escape of fluids should the valve's primary seals fail. The external valve operating means allows for rotation of the valve stem without removal or compromise of the seal. A stationary operating seal cap is in threaded and sealed engagement with the valve body. Upon partial disengagement of the stationary operating seal cap, the pressure within the external valve operating means is vented. An external valve stem drive protrudes through the top of the stationary operating seal cap. An O-ring forms a seal between the two. The bottom of the external stem drive mates with the rotating valve stem while the top of the external stem drive is shaped so as to allow gripping by a tool. Rotation of the external stem drive via the tool effects rotation of the valve stem while the seal surrounding it is maintained.

5 Claims, 1 Drawing Sheet

5,590,680

EXTERNAL VALVE OPERATING MEANS

BACKGROUND OF THE INVENTION

1. Field of the Invention

The present invention relates generally to valves with rotating stems carrying fluids under pressure and, more particularly, to novel valve cap assemblies for use on such valves.

2. Discussion

A number of known types of valves, such as ball valves, for example, carrying fluids under pressure employ rotatable valve stems as a means of operating the valves. More specifically, the flow of fluid through such a valve may be controlled by the rotation of its stem by a tool.

Such valves typically employ a valve body through which a fluid passageway extends. The valve stem passes through a separate passageway, or valve stem passageway, in the valve body. Since one end of the valve stem protrudes from the exterior of the valve body, to allow manipulation, and the other end connects to the flow control means in the interior fluid passageway, the valve stem passageway must extend from the exterior of the valve body through to the fluid passageway within the valve body. As such, a valve stem seal, often consisting of an O-ring, is employed to seal the valve stem passageway as well as to provide a bearing for resisting the internal pressure load acting on the valve stem.

If the valve stem seal fails, internal pressure will force the fluid being carried by the valve through the valve stem passageway to the exterior of the valve body. Depending on the nature of the valve stem seal failure, the fluid may either drip, flow or spray out of the valve body. This leakage could easily cause damage to surrounding components or create hazardous conditions. To guard against such a result, valve caps of known type are typically placed upon the valves so as to provide a sealed cover around the valve stem and valve stem passage opening in the valve body. Should valve stem seal failure occur when such a valve cap is in place, the fluid leakage will be contained within the valve cap.

Manipulation of a valve utilizing such a valve cap requires the removal of the valve cap for access to the valve stem. This takes additional time, effort and tools. Removed valve caps could also be lost, misplaced or not replaced through error. In addition, repeated removals and replacements of a cap can cause the cap seal itself to wear prematurely. For these and other reasons there is a chance of fluid leakage from the valve cap.

It is, therefore, an object of the present invention to provide a valve cap in combination with an external valve stem drive that together allow manipulation of the valve stem without removal of the valve cap or endangerment of the valve cap seal.

SUMMARY OF THE INVENTION

The present invention provides for an external valve operating means for operating a valve maintained under internal pressure, where the valve is of the type having a rotatable valve stem. The external valve operating means covers and seals the area surrounding the valve stem and allows for rotation of the valve stem without removal of the external valve operating means or compromise of the seal.

A hollow operating seal cap is attached to the valve body with threads so as to allow removal. A venting O-ring, seated in the operating seal cap, forms a seal with the valve body when the operating seal cap is screwed onto or otherwise snugly secured to the valve body. The seal releases or vents internal pressure upon loosening of the stationary operating seal cap.

An external valve stem drive attaches at its lower end to the valve's valve stem, while its upper end protrudes through an opening in the top of the operating seal cap. The upper end of the external stem drive is shaped so that it may be gripped or otherwise drivingly engaged and turned by a suitable tool which, as a result, effects turning of the valve stem. An O-ring seal is disposed between the external valve stem drive and the operating seal cap so as to form a seal. This seal is maintained when the external valve stem drive is rotated.

For a more complete understanding of the nature and scope of the invention, reference may now be had to the following detailed description of embodiments thereof taken in conjunction with the appended claims and accompanying drawings.

DESCRIPTION OF THE PREFERRED EMBODIMENTS

Figure 1:
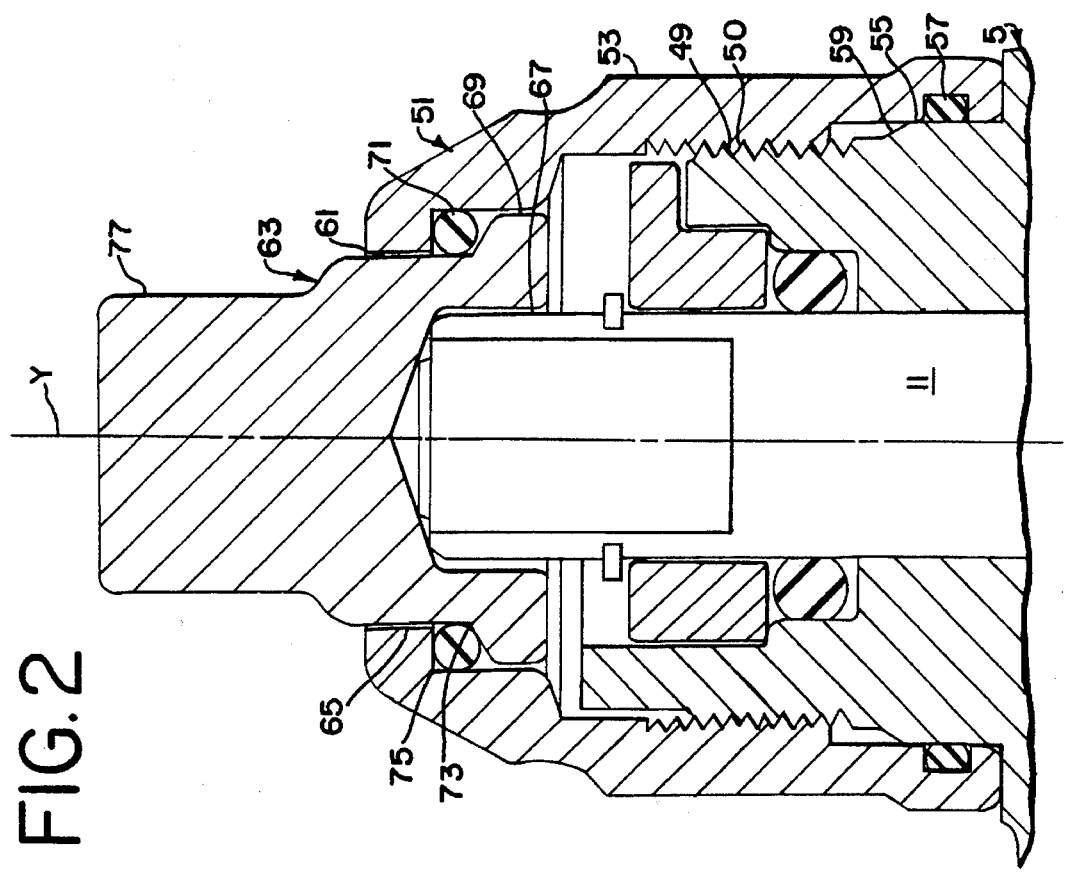
FIG. 1 is a vertical cross-sectional view of a known type of quarter turn ball valve in the open position incorporating a preferred embodiment of the external valve operating means of the invention.

A prior art quarter turn ball valve incorporating the external stem drive valve cap of the invention is indicated generally at 3 in FIG. 1. Valve 3 incorporates a valve body indicated generally at 5. The valve body 5 includes a lower ball valve member receiving portion 6 and an upper valve stem receiving portion 7. Contained within the ball valve member receiving portion 6 of body 5 is a ball valve member 8 and ball seals 9—9. Contained within the valve stem receiving portion 7 is a valve stem 11 and the valve stem packing or seal configuration indicated generally at 13.

The ball valve member 8 is rotatable about axis Y—Y, and includes a fluid passageway 15 therethrough to communicate with fluid line input and output ports 19 and 21 when in the open position as shown in FIG. 1. Fluid flows through the passageway 15 in a direction parallel to axis X—X when the ball valve member is in an open position. Alternatively, as is well understood, a quarter turn rotation of ball valve member 8 places it in the closed position which prevents communication and thus the flow of fluid between the fluid line inlet and outlet ports 19 and 21. The ball seals 9—9, made of Teflon or other suitable materials, prevent leakage of fluid around ball member 8.

The bottom of valve stem 11 engages slot 23 in the top of ball member 8 for rotating ball member 8 as valve stem 11 is rotated about axis Y—Y. The top portion of valve stem 11 extends beyond the valve stem seal configuration, indicated generally at 13, and valve body 5 and is shaped to permit engagement to rotate valve stem 11.

The valve stem seal configuration 13 is located in annular recesses in the upper valve stem receiving portion 7 of the valve body 5. A primary seal washer 29, made of Teflon or other suitable material resistant to fluid passage through the valve 3, is seated in the upper end of bottom annular recess 31 so as to seat against flange 33 of valve stem 11. Seated in annular recess 35, above collar portion 36, is O-ring 37. O-ring 37 is also made of Teflon or some other material suitable to prevent fluid leakage. O-ring 37 has an interference fit both on its inner circumference with valve stem 11 and its outer circumference with the side wall of annular recess 35 and thus serves to prevent the passage of fluid should the primary seal washer 29 fail. Located above annular recess 35 is a larger diameter annular recess 39.

Resting on the shoulder formed between annular recess 35 and the larger diameter annular recess 39 is gland 41 which serves as a stem guide. A retaining ring 47 fits into an annular groove in valve stem 11 to secure the valve stem seal configuration in place.

Figure 2:
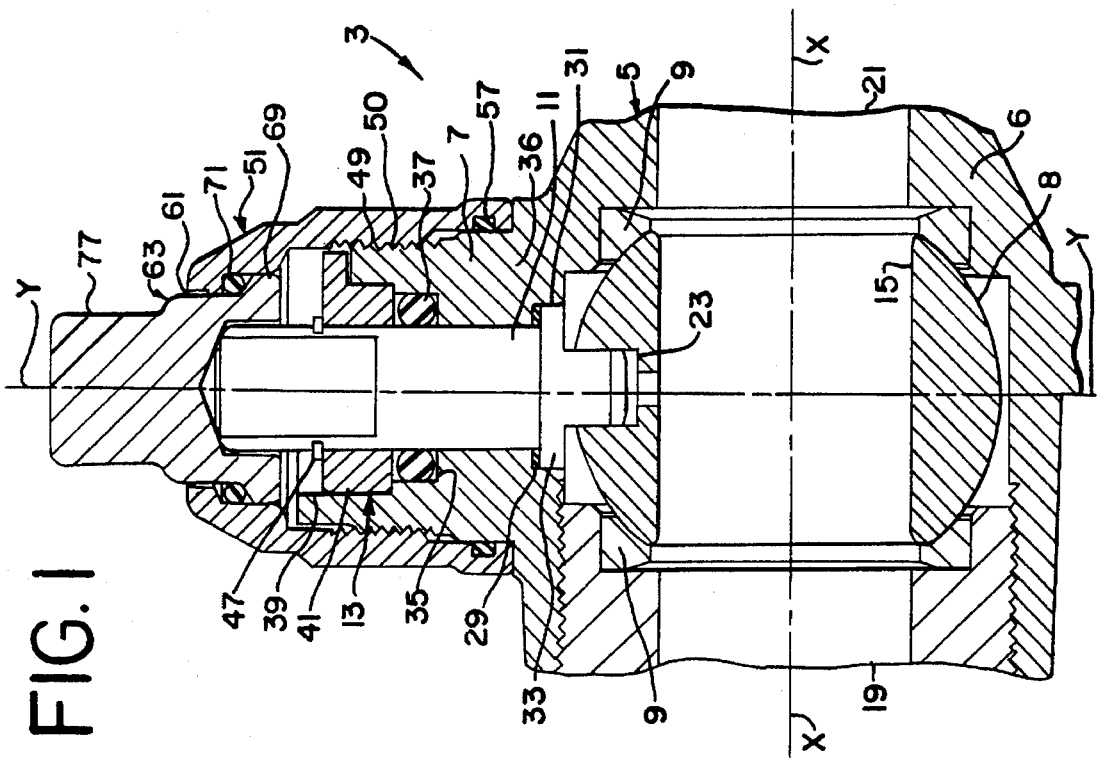
FIG. 2 is an enlarged view of the embodiment of the external valve operating means of FIG. 1.

Valve stem receiving portion 7 of valve body 5 has threads 49 upon its exterior surface. These threads mate with the threads 50 upon the interior surface of a valve cap—a component of the external valve operating means forming a preferred embodiment of the present invention, shown generally at 51. FIG. 1 and FIG. 2 show external valve operating means 51 in complete threaded engagement with valve body 5 with interengagement of threads 49 and 50.

FIG. 2 shows an enlarged view of external valve operating means 51. Adjustable and removable operating seal cap 53 has a circumferential inner annular recess 55 within the periphery of its bottom opening. Seated within annular recess 55 is venting O-ring 57, which is made of Teflon or some other material suitable to preventing fluid passage. As shown in FIG. 2, when the operating seal cap 53 is in complete threaded engagement with valve body 5, venting O-ring 57 forms a circumferential seal so as to contain any release of fluid from valve 3 within the external valve operating means 51. Removal of the external valve operating means 51 may be necessitated by servicing requirements of valve 3. The seal formed by venting O-ring 57 is broken when the operating seal cap 53 is loosened by rotation to the point where venting O-ring 57 passes over beveled or tapered shoulder 59. Threads 49 and 50 are still partially engaged at this point so that the pressure within the external valve operating means is released before external valve operating means 51 may be removed from valve body 5.

Protruding through top opening 61 in the top of operating seal cap 53 is an external valve stem drive, indicated generally at 63. The bottom portion 65 of external valve stem drive 63 has an internal recess 67 which is shaped to mate with and drivingly engage the top of valve stem 11. An annular flange 69 is integrally formed on the bottom of external valve stem drive 63.

O-ring seal 71 is seated in the annular space formed by lower shoulder 73, located between bottom portion 65 and annular flange 69, and upper shoulder 75, located within the periphery of top opening 61 of operating cap 53. O-ring seal 71 is also made of Teflon or some other material suitable to preventing fluid passage. O-ring seal 71 is compressed as external stem drive 63 and operating seal cap 53 are axially pulled together by the engagement of threads 49 and 50. O-ring seal 71 maintains its seal as external valve stem drive 63 is rotated. During removal of the external operating means 51, any unvented internal pressure acts on the underside of the valve stem drive 63 so as to maintain the seal formed by the O-ring seal No. 71.

The top portion 77 of external valve stem drive 63 is shaped so as to allow gripping and turning by a tool. This results in the rotation of the valve stem 11 which in turn allows manipulation of the attached valve.

Having described the invention generally in detail in connection with the drawings, including presently preferred embodiments thereof, those skilled in the art will be able to practice the invention either according to the embodiments disclosed or according to other embodiments without departing from the spirit and scope of the appended claims.

What is claimed is:

1. External valve operating means for operating a valve maintained under internal pressure and having a valve body and a rotatable valve stem, which comprises:

a hollow adjustable and removable operating seal cap having a top opening and a bottom opening and wherein the inner surface has threads for threaded engagement with the valve body;

an external valve stem drive having a lower end in mating operative engagement with an upper portion of said valve stem, said external valve stem drive having an upper end protruding through said top opening of said operating seal cap, said upper end of said external valve stem drive being shaped to be engaged by a tool whereby said valve stem may be rotated to operate the valve;

a first O-ring seal disposed between the lower end of said external valve stem drive and said operating seal cap in the proximity of said top opening so as to form a seal therebetween which is maintained by any unvented internal valve pressure;

a second O-ring seal disposed between a lower portion of said operating seal cap and said valve body adjacent said threaded engagement; and means for venting said external valve operating means whereby said operating seal cap is movable along said lower end of said external valve stem drive and the portion of said valve body adjacent said threaded engagement to allow partial disengagement of said threaded engagement so that said venting means is established between said seal cap and said valve body when said second seal is in a non-sealing engagement with said valve body for venting internal pressure within said external valve operating means before removal thereof.

2. The external valve operating means of claim 1 wherein said operating seal cap is generally bell-shaped with said top opening therein having an inwardly extending circumferential flange that engages the top of said first O-ring seal and said lower end of said external valve stem drive is in the form of an outwardly extending circumferential flange the upper side of which engages the bottom of said first O-ring seal.

3. The external valve operating means of claim 2 wherein the first O-ring is compressed between said inwardly extending circumferential flange of said operating seal cap and said outwardly extending circumferential flange of said external valve stem drive by the engagement of said valve stem with said external valve stem drive and the simultaneous threaded engagement of said valve body with said operating seal cap.

4. The external valve operating means of claim 2 wherein the first O-ring is compressed between said inwardly extending circumferential flange of said operating seal cap and said outwardly extending circumferential flange of said external valve stem drive by fluid pressure within said external valve operating means.

5. The external valve operating means of claim 1 wherein said means for venting said external valve operating means comprises:

an inner annular recess within the periphery of said bottom opening of said operating seal cap; and said second O-ring seated in said annular recess for forming a seal with the valve body when said operating seal cap is in complete threaded engagement with the valve body and for releasing the seal upon partial threaded disengagement of said operating seal cap with the valve body.

* * * * *